United States Patent

Linder et al.

[11] Patent Number: 5,977,766
[45] Date of Patent: Nov. 2, 1999

[54] METHOD AND DEVICE FOR INDUCTIVE MEASUREMENT OF PHYSICAL PARAMETERS OF AN OBJECT OF METALLIC MATERIAL WITH ERROR COMPENSATION

[75] Inventors: Sten Linder; Lennart Thegel; Anders Eidenvall, all of Västerås, Sweden

[73] Assignee: ASEA Brown Boveri AB, Västerås, Sweden

[21] Appl. No.: 08/983,441

[22] PCT Filed: Jun. 17, 1996

[86] PCT No.: PCT/SE96/00785

§ 371 Date: May 27, 1998

§ 102(e) Date: May 27, 1998

[87] PCT Pub. No.: WO97/03337

PCT Pub. Date: Jan. 30, 1997

[30] Foreign Application Priority Data

Jul. 10, 1995 [SE] Sweden .................................. 9502528

[51] Int. Cl.[6] .............................. G01B 7/00; G01N 27/04; G01R 33/12; B21C 51/00
[52] U.S. Cl. .......................... 324/225; 324/236; 324/262
[58] Field of Search ..................................... 324/225, 222, 324/234, 236, 237, 238, 239, 240, 241, 242, 243, 262, 326, 244, 207.12; 340/870.31; 702/85, 104, 191

[56] References Cited

U.S. PATENT DOCUMENTS

| | | | |
|---|---|---|---|
| 4,475,083 | 10/1984 | Linder | 324/227 |
| 4,639,674 | 1/1987 | Rippingale | 324/326 |
| 5,059,902 | 10/1991 | Linder | 324/207.17 |
| 5,270,646 | 12/1993 | Kihlberg et al. | 324/207.16 |

*Primary Examiner*—Walter E. Snow
*Attorney, Agent, or Firm*—Pollock, Vande Sande & Amernick

[57] ABSTRACT

A method and a device for inductive measurement of physical parameters of an object of metallic material by generating a time-varying magnetic field from a primary coil in a measurement range. The magnetic field induces eddy currents in the object which influence the time-varying magnetic field. The field is detected by a measuring coil from which a signal is obtained which carries information about the desired parameters. A field-measuring coil is introduced outside the measurement range, but surrounded by an electric circuit generated at the measurement range. The field-measuring coil senses a current induced in the electric circuit by the time-varying magnetic field. The interfering magnetic field generated by the current, and which influences the time-varying magnetic field, adds an error to the measurement of the measuring coil. The output signal of the field-measuring coil is thereby used to compensate the output signal of the measuring coil so that the error caused by the current in the electric circuit is eliminated.

12 Claims, 2 Drawing Sheets

METHOD AND DEVICE FOR INDUCTIVE MEASUREMENT OF PHYSICAL PARAMETERS OF AN OBJECT OF METALLIC MATERIAL WITH ERROR COMPENSATION

TECHNICAL FIELD

When using inductive measurement technique in connection with electrically conductive materials, for example during working of metallic materials, inductive interference sometimes arises, which may result in considerable errors in the measurement results. Preferably in the rolling of metallic material, it is desired, within the process industry, to be able to continuously measure parameters of the blank to be rolled, such as thickness, edge position, etc., with great measurement accuracy. The present invention relates to a method for reducing an inductive interference effect during inductive measurement of a metallic object, and to a device used therefor.

BACKGROUND OF THE INVENTION

Inductive measurement of physical parameters in a metallic and electrically conductive material is previously known. With an inductive measurement technique, both the distance to and the dimension of a metallic object may be determined. The method also provides a possibility of measuring the electrical resistivity of the material and determining parameters such as the thickness of sheet and pipe walls. U.S. Pat. No. 4475083 for example, it is described how a magnetic field, created by sinusoidal time variation, may be used for measuring distance, dimension and electrical resistivity. By studying the decay of a magnetic field created by means of a square pulse, U.S. Pat. No. 5059902 describes how such technique may be used for determining distance, dimension, electrical resistivity and material thick-ness. From U.S. Pat. No. 5270646 it is also known how the width and the edge position of a rolled billet can be determined by analyzing, having a measurement device with a plurality of measuring coils, the decay of a magnetic field created around the blank to be rolled.

The evaluation technique which is used can briefly be described as follows. A magnetizing field is generated with the aid of a primary coil which can be fed with alternating current or a pulsed bipolar or unidirectional direct current. By evaluating the aperiodic voltage signal which is induced in a measuring coil and which arises in connection with the decaying magnetic field, the distance between the measuring coil and the electrically conductive material can be determined as well as the thickness and the electrical conductivity of the material. The parameters can be substantially determined by sampled measurement, that is, dividing the measurement into different time gaps. The distance between the coil and the material is substantially determined by the quantity of the voltage induced in a time gap immediately after the magnetic field has been shut off.

In most applications, the known methods of measurement function satisfactorily. However, problems arise when the object to be measured is disposed between two contact surfaces to form a closed electric circuit. When the current in the primary coil is broken, a decaying magnetic field arises, which induces eddy currents in the object to be measured. Those eddy currents influence the decaying magnetic field in a way which is characteristic of the object to be measured. The decay process is sensed with the measuring coil, in which the magnetic field induces a voltage, from which the sought parameters can be analyzed. However, the same magnetic field also induces a current in the above-mentioned circuit. The current in this electric circuit in turn causes a magnetic field which counteracts the decaying magnetic field and thus supplies an error in the induced voltage in the measuring coil. By analyzing only the voltage in the measuring coil, the information-carrying signal cannot be distinguished from the interference signal. This can lead to considerable errors in the parameters to be determined. The problem is accentuated when the contact surfaces are located near the measuring coil so that the external closed electric circuit tightly surrounds the measurement range.

During machining of a blank to be rolled, the blank is in continuous contact with the rolls, which in turn are connected to each other via a supporting system of beams or ground. In this way, an external closed electric circuit arises, whereby the blank to be rolled constitutes one of the conductors in the circuit. When applying the known method of measurement, considerable errors may occur when determining, for example, the thickness of the blank to be rolled.

SUMMARY OF THE INVENTION

The object of the invention is to provide a method of measurement and a measurement device for determining physical parameters of a metallic object disposed between two supports to form a closed electric circuit, thus eliminating or at least reducing the above-mentioned drawbacks. This is achieved according to the invention by introducing a field-measuring coil outside the measurement range but surrounded by the closed electric circuit, so that the magnetic field caused by the current in the closed circuit can be determined separately and be used for increasing the accuracy when measuring the sought parameters.

The invention is based on known inductive measurement technique as described, for example, in the above-mentioned patents. Thus, the starting-point is one or more coils which generate a time-varying magnetic field and which measure the inductive effect of the object to be measured on the magnetic field in a measurement range, as well as signal-processing circuits which transform the inductive effect of the object to be measured into the desired parameter. During rolling of a metallic material, wherein the blank to be rolled is disposed on two rolls on both sides of the measurement range, a closed electric circuit is formed around the measurement range with the blank to be rolled as part of the circuit. The current induced in the closed circuit by the time-varying magnetic field can thus be measured with one field-measuring coil. So as not to become influenced by the magnetic properties of the object to be measured, the field-measuring coil must be placed at a distance from the object to be measured but surrounded by the closed electric circuit. By analysis of the voltage in the field-measuring coil, the magnitude of the magnetic field generated by the current in the closed circuit can be determined and its effect on the measurement be eliminated.

A processed signal from the field-measuring coil is used for counteracting the effect of the magnetic interference field on the primary measurement. Preferably, a microcomputer is used for this purpose. The voltage induced in the field-measuring coil is often in direct proportion to the effect of the interfering magnetic field on the voltage in the measuring coil and may, after suitable amplification, be supplied directly to the signal-processing circuits. In those cases where the electric circuit, which according to the above consists of the object to be measured and the two rolls in contact with the object to be measured, is geometrically constant and the resistance in the contact surfaces between the metal parts and the object to be measured is also constant during the measurement process, it is sufficient to measure the current in the circuit at one time only.

BRIEF DESCRIPTION OF THE DRAWINGS

The invention will be described in greater detail by description of an embodiment with reference to the accompanying drawings, wherein.

DETAILED DESCRIPTION OF THE PREFERRED EMBODIMENTS

Figure 1:
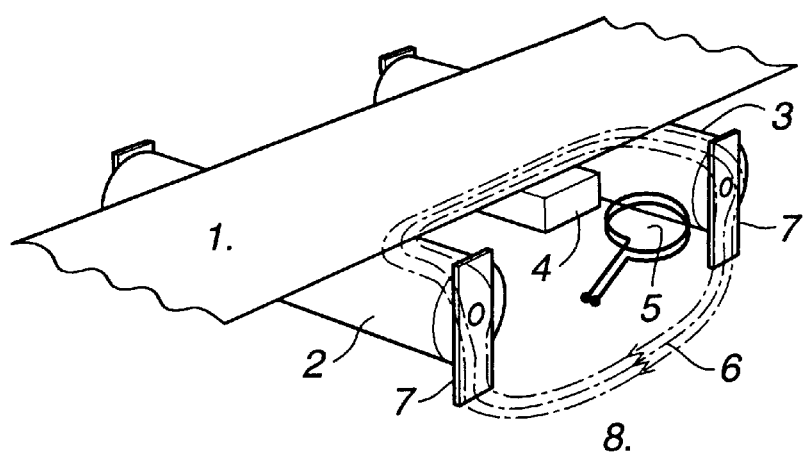
FIG. 1 shows part of a rolling mill with a measurement device according to the present invention.

The rolling mill shown in FIG. 1 comprises a blank 1 to be rolled, which in the present case has the shape of a sheet, which is located between a first roll 2 and a second roll 3. Each of the two rolls is journalled in a bearing attachment 7, connected to a base 8, only partially shown in the figure. Between the rolls and immediately below the sheet, an inductive measurement device 4 is placed. Surrounded by the first roll, the sheet, the second roll, and the base, a field-measuring coil 5 is arranged, which is placed so that its induced measuring voltage is not influenced by the magnetic field generated through the sheet 1 or the measurement device 4.

The measurement is performed in such a way that a primary coil accommodated in the measurement device generates a magnetic field which induces eddy currents in the sheet 1. When the current in the primary coil is broken, the generated magnetic field decays, which causes eddy currents to be induced in the sheet again, and these eddy currents generate a secondary magnetic field which provides information about the desired parameters in the object to be measured. The decay process is detected with a measuring coil which is included in the measurement device and in which a voltage is induced from the decaying magnetic field. By analysis of the stationary and the decaying magnetic fields, physical parameters such as, for example, the distance between the measuring coil and the sheet, the degree of coverage of the sheet over the measuring coil, and the thickness of the sheet can be determined.

In a rolling mill, as shown in FIG. 1, a closed electric circuit may be formed in that the blank to be rolled 1, the first roll 2 and its bearing attachment, the base 8 and the second roll 3 and its bearing attachment, which are all electrically conductive, are connected to each other. When the applied primary magnetic field decays, eddy currents are induced in the object to be measured, and these eddy currents generate a secondary magnetic field which contains information about the object to be measured. At the same time, however, a current 6 is also induced by the decaying magnetic field, as indicated by dash-dotted lines in FIG. 1, in the closed circuit described above. The current 6, which may be considerable if there are short distances between the parts included in the circuit, generates a tertiary magnetic field, which counteracts the information-carrying primary and secondary magnetic fields. The voltage induced in the measuring coil thus becomes the result of the decay in all three magnetic fields and is thus disturbed by the tertiary magnetic field. An analysis of only the signal in the measuring coil may, therefore, give considerable errors in the determination of the desired parameters. This is one of the reasons why measurements with inductive measurement systems have been carried out for such a long time, which sometimes has resulted in such large errors that the method has been considered unsatisfactory.

By placing the field-measuring coil 5 so that it senses the tertiary magnetic field but is not influenced by the primary or secondary magnetic fields, a corrective signal may be supplied to the measurement device. The field-measuring coil 5 is placed at the edge of the measurement range, but inside the closed circuit, in which the current 6 is induced. The time-varying voltage induced in the field-measuring coil constitutes a value of the magnitude of the error which is caused by the tertiary magnetic field when determining the desired parameters.

Figure 2:
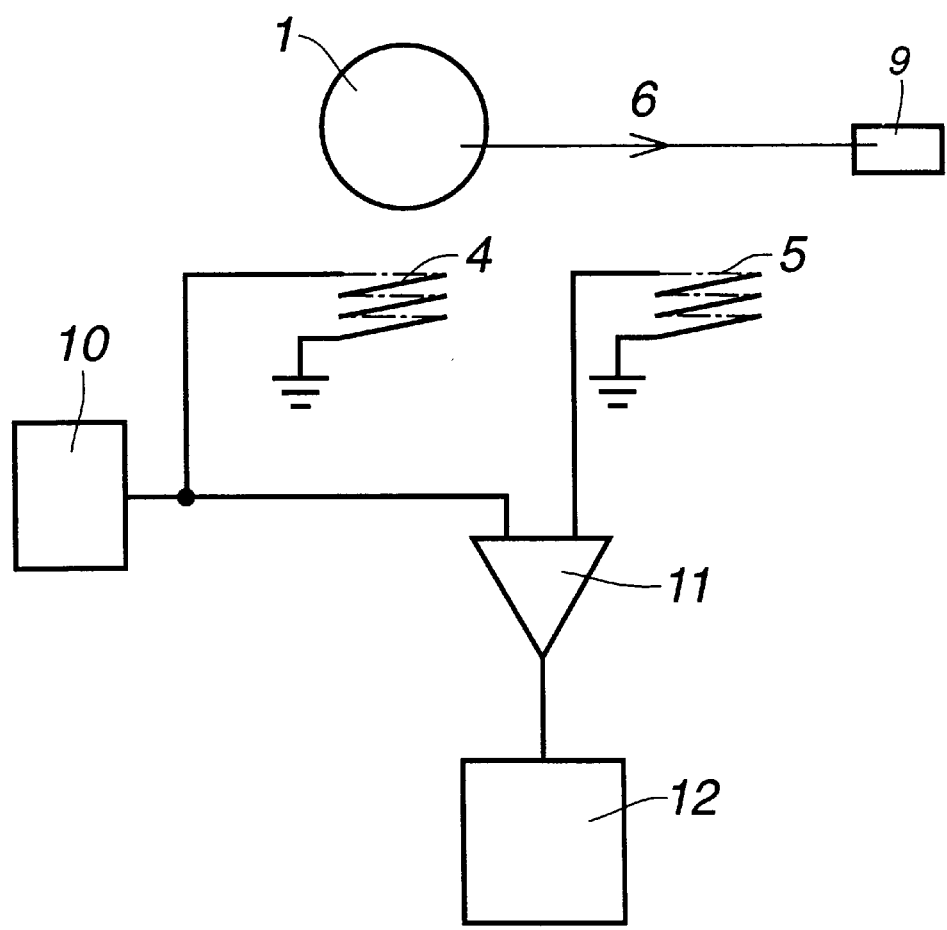
FIG. 2 shows an elementary diagram for measurement and signal processing according to the invention.

FIG. 2 shows an elementary diagram of a device for measurement and signal processing according to the invention. The figure intends to show a cross section of an elongated object 1 to be measured, for example a bar, against which a coil 4 is arranged in a contactless manner. It is assumed that on either side of the measurement range, that is, in a plane above and below the figure, respectively, there is a machine part in contact with the object and that these two machine parts are electrically interconnected by an electric conductor 9 outside the measurement range, so that a closed electric circuit is formed. To measure the distance between the coil 4 and the object 1 to be measured and/or the electrical resistivity of the object to be measured, the coil 4 is fed with a time-varying current from a drive circuit 10. The current gives rise to a time-varied magnetic field, which can be sensed in the coil 4 during periods when the coil is not used for generating the magnetic field. The current 6 induced by the decaying magnetic field in the closed circuit is sensed by means of a field-measuring coil 5. This is placed so that it does not sense the normal, undisturbed effect of the object on the magnetic field, but does sense the effect on the undisturbed magnetic field of the interfering magnetic field generated by the current 6. The voltage signals from the coil 4 and from the field-measuring coil 5 are subtracted in a differential amplifier 11. The output signal from the amplifier is thus compensated for the interfering magnetic field and the correct physical parameters can be determined in a processing unit 12.

Figure 3:
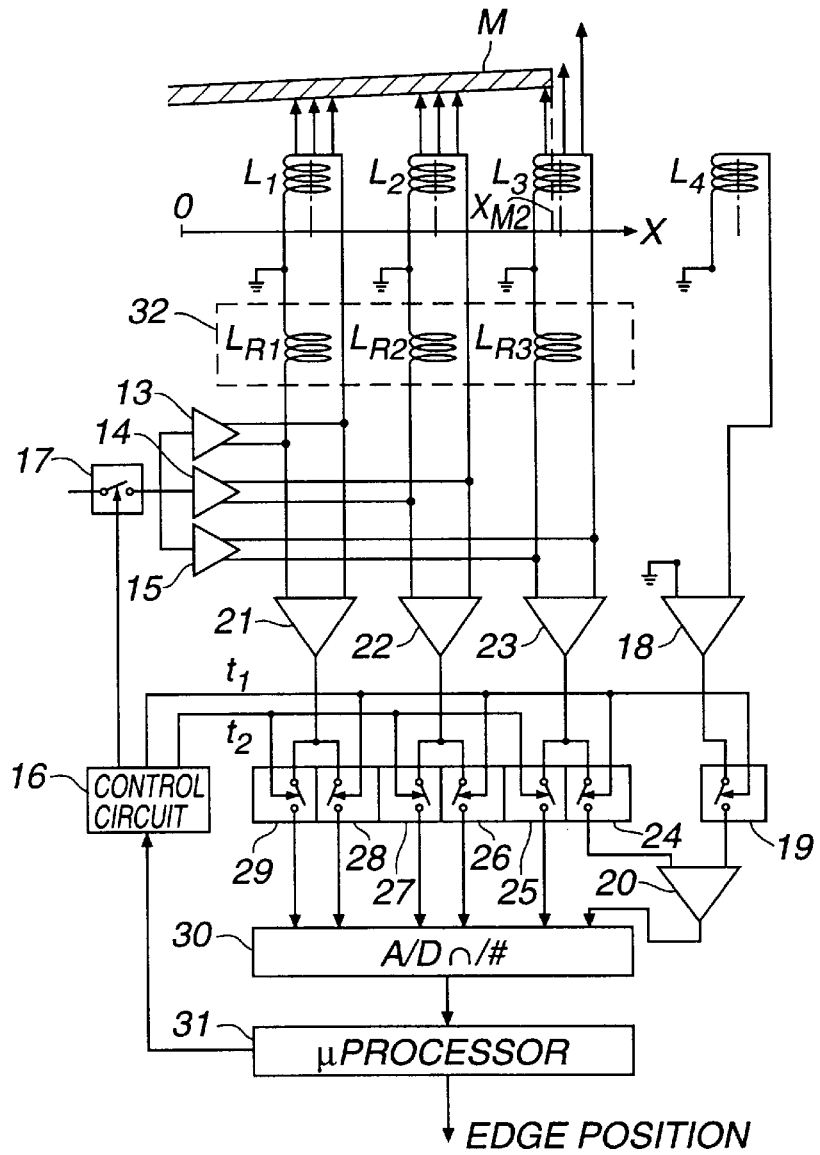
FIG. 3 shows an elementary diagram for an edge position measurement device with an added unit for eliminating the influence from an external interfering magnetic field.

FIG. 3 shows how the invention can be used for edge position measurement of sheet according to U.S. Pat. No. 5270646. Here, signals from the coils are utilized to express distance, position $X_{M2}$ and inclination of an object M to be measured. However, this method is very sensitive to interference from external magnetic fields, and in rolling mills obvious errors often occur because of a magnetic interference field which is caused by an external electric circuit. Three coils $L_1$, $L_2$ and $L_3$ are fed with current from three drive circuits 13, 14 and 15, the power supply of which is controlled by a control circuit 16 via a relay 17, so that a time-varied magnetic field is generated around the object to be measured. When the current supply ceases, the magnetic field decays and induces in the coils $L_1$, $L_2$ and $L_3$, which now are used as measuring coils, a voltage which is proportional to the decay process. The voltages in the coils $L_1$, $L_2$ and $L_3$ are compared with reference values from three reference coils $L_{R1}$, $L_{R2}$ and $L_{R3}$, which are mounted in a separate unit 32, and are amplified in separate amplifiers 21, 22 and 23. A magnetic interference field from an external current loop influences only the outermost coil $L_3$. To reduce the effect of this interference field, an additional field-sensing coil $L_4$ is placed outside the region is concerned by the changes in the magnetic field which caused by the sheet. The signal from the coil $L_4$ is amplified in an amplifier 18 and is integrated in an integrator 19. The signals from the three amplifiers 21, 22 and 23 are integrated in three pairs of integrators 24, 25, 26, 27, 28 and 29. All the integrators are controlled by the control circuit 16 so that the integration may take place in time gaps, whereby the integrators 24, 26 and 28 integrate the signal during a first time gap and the others during a second time gap.

The signal which is integrated from the external measuring coil $L_3$ during the first time gap and which is obtained from the integrator 24, is adjusted for errors caused by the magnetic interference field, measured with coil L4, the signal of which is obtained from the integrator 19, by subtraction in a differential amplifier 20. The signal from the differential amplifier 20 and the signals from the integrators 25, 26, 27, 28 and 29 are converted from analog to digital form in an analog-to-digital (A/D) converter 30 and processed in a micro-processor 31 according to the known method. The subtraction in the differential amplifier 20 may, with the same final result, be instead made in the microprocessor. In that case, the differential amplifier 20 is omitted and the signal from the integrator 19 is converted into digital form in a separate A/D channel, whereupon subtraction occurs in the microprocessor 31.

Normally, it is sufficient to adjust signal values, taking into consideration interference fields from an external current loop, during a first time gap. When measuring on thin sheet, however, interference during a second time gap may also be of importance for the accuracy of the measurement result. In this connection, in the same way as shown in FIG. 3, a channel for compensation of the integrated signal from the integrator 10 may be added.

Figure 4:
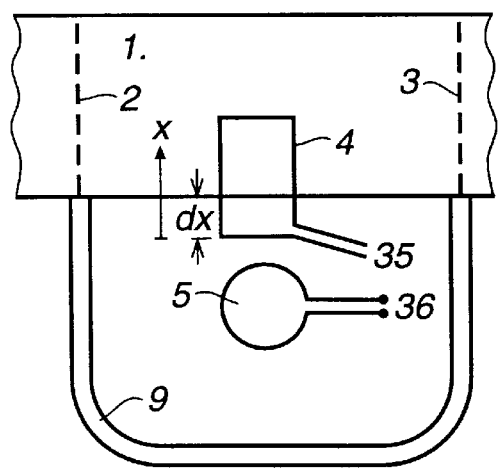
FIG. 4 shows an example of a measurement situation wherein the interference effect is generated by an electric circuit with constant electric properties.

FIG. 4 shows an example wherein the interference effect is generated by an electric circuit with constant electrical properties. In many cases in industrial processes where material such as sheet, bar, tube and similar products are manufactured, machine parts in the vicinity of the measurement range make contact with a high pressure with the material. The machine parts may be rolls for deformation of the material, rollers for alignment of the material, or other similar machine elements. In such cases, the electric circuit formed according to the above becomes electrically constant as long as the object to be measured is stationary in relation to the inductive measurement. FIG. 4 shows measurement at the edge of a horizontal sheet 1 in a plane view. A magnetic field is generated in the measurement range by means of a coil 4 by supplying a time-varying current across the connection 35 of the coil. In this case, the coil 4 is rectangular and that part of the surface of the coil which is not covered with sheet is designated dx. Across the connection 35, the decaying magnetic field in the measurement range is measured. Machine parts, for example rolls, are in continuous contact with the horizontal sheet 1 along the dashed lines 2 and 3. The contact resistance along these lines is substantially constant. A closed electric circuit arises via an electric contact path 9, which may be in the form of a base. A field-measuring coil 5 outside the measurement range, but inside the closed circuit, supplies a signal via a connection 36, which signal is used for reducing the effect of the interference field.

The electric current loop described in FIG. 4 is constant. This makes it possible to use a simpler measurement process than that described above. The measurement of the interfering magnetic field is then carried out during a period which precedes the continuous measurement during the process itself. with the field-measuring coil 5, the magnetic interference field is measured with the sheet in various positions across the coil. From this measurement, a value of the effect of the interfering magnetic field as a function of the position of the sheet edge is obtained. This value is to be reduced from the measured value during the subsequent process measurement. This operation may, for example, be done in the analysis unit which converts signal amplitude to position of the sheet edge. Such an analysis unit may be in the form of a microcomputer. The field-measuring coil 5 may, after measurement of the effect of the interference field, be dismantled. The measured reduction is valid as long as the path 6 defining the external electric circuit is not changed, for example by reconstructing the machine around the measurement range.

In the case shown in FIG. 4, the magnitude of the interference field is directly dependent on that part of the surface of the coil which is not covered by sheet. This means that a measurement of the magnitude of the interference field only has to be done at a definite sheet position. Thereafter, each interference field at other sheet positions may be calculated, since the degree of coverage is directly proportional to the measured value obtained at the definite sheet position. Alternatively, the effect of the interference field can be determined as a value of that error of the position of the edge of the sheet which is measured at a certain degree of coverage. Since errors at other edge positions are directly proportional to the measured error, any other error may be calculated. This type of calculations is suitably performed in a microcomputer comprised in the measurement system. In case the coil is not rectangular, the calculation is made in proportion to that surface of the coil which is not covered with sheet in relation to the whole surface of the coil.

Normally, the interference-field sensing field-measuring coil 5 is placed outside the measurement range. In practice, this means that it is included in the measurement device and placed so that the distance to the nearest measuring coil is equal to or larger than the diameter of the measuring coil. In certain cases, for example when the measurement space is limited, it may be difficult in practice to achieve such a location. In such cases, the field-measuring coil may be placed closer to the measuring coil, but will then be influenced by the above-mentioned secondary magnetic field, which is dependent on the edge position dx of the sheet. From the measuring coil there is obtained, after signal processing, a signal which primarily is dependent on the position dx of the sheet edge but, to a smaller extent, also on the magnetic interference field generated by the closed circuit. From the field-measuring coil 5 there is obtained, after signal processing, a signal which primarily is dependent on the interference field but, to a smaller extent, on the position of the sheet edge. By measurement of the signals of the measuring coil and the field-measuring coil at different positions of the sheet edge, the effect of the interference field on the signals from the two coils may be stated in tables or mathematical relations from which the reduction of the effect of the interference field on the edge measurement may be calculated. Such a calculation is preferably carried out by a microprocessor connected to the measurement system.

The present invention is not limited to be applied in connection with rolling mills, or edge position measurement devices, but may be used in connection with all inductive measurement when problems with an induced interference field in an external circuit occur. Thus, it may be applied also to inductive distance and dimension measurement, to measurement of electrical resistivity and to measurement of sheet thickness. The condition is then that the interference field is measured in the same way as the primary measurement of the desired parameter.

The invention is not limited to measurement with pulsed magnetic fields only but applies also to other types of time-varying magnetic fields.

We claim:

1. An apparatus for inductive measurement of an object of metallic material comprising:

a primary coil for generating and measuring magnetic fields, the primary coil arranged close to the object and generating an output signal carrying information about parameters of the object;

a field-measuring coil arranged at an edge of a measurement range and within an electric circuit induced by the magnetic field to measure an interfering magnetic field and generate an output signal regarding the same; and a microprocessor responsive to both output signals which compensates the output signal of the primary coil with the output signal of the field-measuring coil to eliminate an error caused by the interfering magnetic field.

2. The apparatus of claim 1 wherein the interfering magnetic field is generated by a current induced in the electric circuit at the measurement range.

3. A device according to claim 1, wherein the field-measuring coil is used even when it contains a component which relates to the information-carrying time-varying magnetic field by the primary coil and the field-measuring coil being calibrated simultaneously for a number of different measurement situations.

4. A device according to claim 1, wherein the interfering magnetic field is measured with the field-measuring coil for one position of the object and the compensation of the output signal of the primary coil is calculated from this measurement for all positions of the object.

5. A method for inductively measuring parameters of an object of metallic material comprising:

a) generating a time-varying magnetic field with a primary coil to induce eddy currents in the object which, in turn, influence the time-varying magnetic field;

b) measuring the influence of the eddy currents on the time-varying magnetic field with a measuring coil;

c) arranging a field-measuring coil outside of a measurement range, but inside an electric circuit induced by the time-varying magnetic field;

d) sensing a current induced in the electric circuit by the magnetic field with the field-measuring coil; and e) compensating an output of the measuring coil with an output of the field-measuring coil to eliminate an error caused by the current in the electric circuit.

6. The method of claim 5 wherein the primary coil and the measuring coil are the same coil.

7. The method of claim 6 wherein steps a) and b) comprise:

supplying a first current to the primary coil to generate the magnetic field;

stopping the supply of the first current to the primary coil; and measuring the influence of the eddy currents with the primary coil, after stopping the supply of current to the primary coil.

8. A method according to claim 5, wherein a signal from the field-measuring coil is used even if it contains a component which relates to the information-carrying time-varying magnetic field by the measuring coil and the field-measuring coil being calibrated simultaneously for a number of different measurement situations.

9. A method according to claim 5, further comprising measuring an interfering magnetic field with the field-measuring coil for one position of the object and wherein the compensation of the output signal of the measuring coil is calculated from this measurement for all positions of the object.

10. A method for inductively measuring parameters of an object of metallic material comprising:

a) generating a time-varying magnetic field with a primary coil to induce eddy currents in the object which, in turn, influence the time-varying magnetic field;

b) measuring the time-varying magnetic field influenced by the eddy currents with a measuring coil;

c) generating an output signal from the measuring coil carrying information about parameters of the object;

d) arranging a field-measuring coil outside of a measurement range, but inside an electric circuit induced by the time-varying magnetic field;

e) sensing a current induced in the electric circuit by the time-varying magnetic field with the field-measuring coil, the current generating an interfering magnetic field which, in turn, influences the time-varying magnetic field; and f) compensating an output of the measuring coil with an output of the field-measuring coil to eliminate an error caused by the current in the electric circuit.

11. The method of claim 10 wherein the primary coil and the measuring coil are the same coil.

12. The method of claim 11 wherein steps a) and b) comprise:

supplying a first current to the primary coil to generate the magnetic field;

stopping the supply of the first current to the primary coil; and measuring the influence of the eddy currents with the primary coil, after stopping the supply of current to the primary coil.

* * * * *